US009442899B2

(12) United States Patent
Oki

(10) Patent No.: US 9,442,899 B2
(45) Date of Patent: Sep. 13, 2016

(54) IMAGE FORMING APPARATUS, TEXT DATA EMBEDDING METHOD, AND RECORDING MEDIUM

(71) Applicant: KONICA MINOLTA, INC., Chiyoda-ku, Tokyo (JP)

(72) Inventor: Makoto Oki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/546,776

(22) Filed: Nov. 18, 2014

(65) Prior Publication Data
US 2015/0146220 A1 May 28, 2015

(30) Foreign Application Priority Data

Nov. 26, 2013 (JP) .................................. 2013-244436

(51) Int. Cl.
G06F 17/21 (2006.01)
G06K 15/02 (2006.01)
H04N 1/00 (2006.01)
H04N 1/32 (2006.01)
G06K 9/00 (2006.01)

(52) U.S. Cl.
CPC ......... G06F 17/214 (2013.01); G06K 15/1827 (2013.01); H04N 1/00331 (2013.01); H04N 1/32144 (2013.01); G06K 9/00463 (2013.01); H04N 2201/3266 (2013.01)

(58) Field of Classification Search
CPC ............................. H04N 1/393; G06F 17/214

USPC .......................................... 358/1.2, 474, 505
See application file for complete search history.

(56) References Cited

U.S. PATENT DOCUMENTS

| 5,588,072 A | * | 12/1996 | Wang ................. G06K 9/00442 382/176 |
|---|---|---|---|
| 2009/0028446 A1 | * | 1/2009 | Wu et al. ....................... 382/229 |
| 2009/0044105 A1 | * | 2/2009 | Matsukawa et al. ......... 715/256 |
| 2010/0232690 A1 | * | 9/2010 | Kanatsu et al. ............... 382/165 |

FOREIGN PATENT DOCUMENTS

| JP | 4590433 B2 | 12/2010 |
|---|---|---|
| JP | 5197694 B2 | 5/2013 |

* cited by examiner

Primary Examiner — Jacky X Zheng
(74) Attorney, Agent, or Firm — Holtz, Holtz & Volek PC

(57) ABSTRACT

An image forming apparatus includes: a scanner that obtains an image file by document scanning; a character recognition processor that obtains a text string from each line of text by performing character recognition; a text string splitter that splits each the text string into a plurality of short text strings in accordance with a predetermined rule; a font size determining portion that determines a uniform font size for each the text string; a position determining portion that determines x-axis positions for the short text strings on the basis of the x-coordinates of the characters at the forefront in the respective short text strings, the short text strings each having its x-axis in the forward and backward reading directions; and an embedding portion that embeds text data of the short text strings in the image file at the respective x-axis positions in the uniform font size for the entire text string.

30 Claims, 6 Drawing Sheets

|  | Conventional Embedding Process | | | Embedding Process according to the Embodiment | | |
| --- | --- | --- | --- | --- | --- | --- |
|  | Font Size | X-coordinate | Y-coordinate | Font Size | X-coordinate | Y-coordinate |
| well | 15 | 10 | 8 | 15 | 10 | 8 |
| over | 10 | 50 | 5 | 15 | 50 | 8 |
| a | 10 | 110 | 5 | 15 | 110 | 8 |
| million | 15 | 130 | 8 | 15 | 130 | 8 |

FIG.6A
FIG.6B
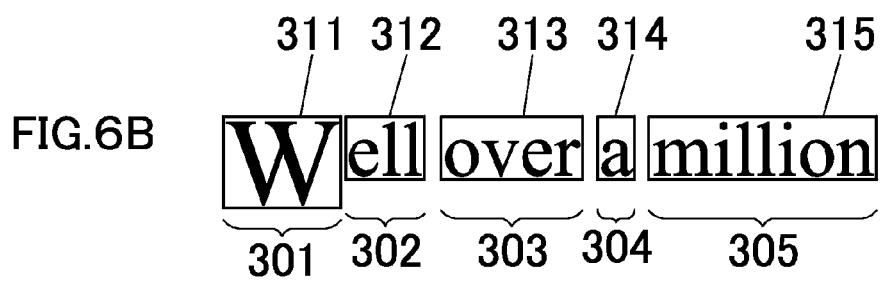
FIG.6C
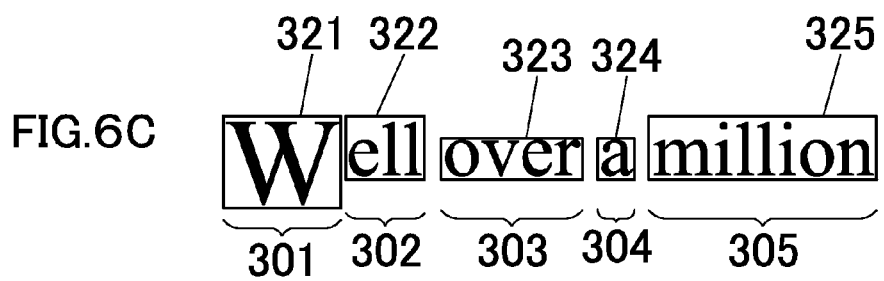
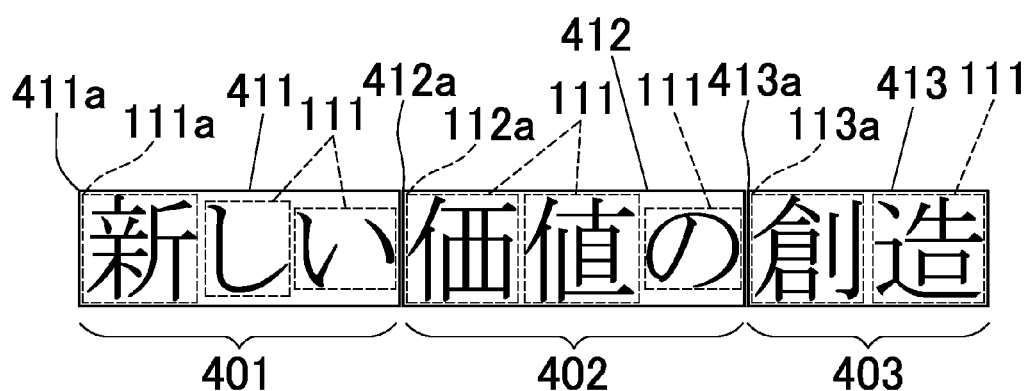
FIG.7

IMAGE FORMING APPARATUS, TEXT DATA EMBEDDING METHOD, AND RECORDING MEDIUM

This application claims priority under 35 U.S.C. §119 to Japanese Patent Application No. 2013-244436 filed on Nov. 26, 2013, the entire disclosure of which is incorporated herein by reference in its entirety.

BACKGROUND OF THE INVENTION

1. Field of the Invention

The present invention relates to: an image forming apparatus, i.e., a multi-function peripheral (MFP) such as a multifunctional digital machine; a text data embedding method to be implemented by the image forming apparatus; and a non-transitory computer-readable recording medium storing a program for making a computer of the image forming apparatus implement the text data embedding method.

2. Description of the Related Art

The following description sets forth the inventor's knowledge of related art and problems therein and should not be construed as an admission of knowledge in the prior art.

There has already been an image forming apparatus having the following functions: scanning an image on a document by its scanner; converting the image file into portable document format (PDF); transferring the PDF file to an external apparatus; and storing the PDF file on the image forming apparatus itself.

With this image forming apparatus, users cannot perform a string search unless image files include text data.

Meanwhile, it is common to obtain a text image from a document by a scanner, perform character recognition to convert the text image into text data by a character recognition device, and embed the text data in an image file (for example, Japanese Patents No. 5197694 and No. 4590433). The text data is embedded in a transparent font behind the image file in JPEG format, for example, which allows users to perform a string search.

The character recognition device outputs position information indicating the vertical and horizontal position of each character and the coordinates of characters in each line of text. A position and font size for the text data to be embedded in the image file and others are determined by the position information received therefrom.

In the text data embedding process as described above, there is no limitation on the number of characters in one text string; that is, one text string can be embedded regardless of whether it is composed of only one character or more characters. For a text string to be embedded, a coordinate for the start of the text string, a font size, a horizontal scale factor (scale in the forward and backward reading directions), and other parameters can be specified but a coordinate for the end of the text string cannot be specified. In order to adjust the text string to the corresponding text image in the image file, it is necessary to obtain a horizontal scale factor for the text string. Only if the text string has all characters in a monospaced font, a horizontal length for the text string can be calculated accurately and thus the positions can be adjusted correctly. In contrast, that may not be calculated accurately if the text string has some characters in a proportional font that displays different characters in different widths and is commonly used in ordinary documents. Upon many characters in a proportional font, even a large error in position adjustment can be caused by an inaccurate horizontal scale factor being obtained.

To solve this problem, there suggested are some methods of splitting a text string obtained from each line of text, into a plurality of short text strings and adjusting each short text string to the corresponding text image, which aims to prevent an error in adjustment of horizontal position. These suggested methods are for example: (1) splitting a text string into a plurality of individual characters and adjusting each character to the corresponding text image; and (2) splitting a text string into a plurality of short text strings at every separator such as a comma, dot, or space and adjusting each short text string to the corresponding text image.

However, these conventional methods, which aim to prevent an error in position adjustment, still have an outstanding problem as described below.

In these conventional methods, after character recognition, a font size for each character to be embedded in the image file is determined by calculating the height of each character from its vertical coordinate; accordingly, when the text string is split into a plurality of short text strings, a font size for each short text string is determined on the basis of the heights of characters in each short text string.

For example, when the text string "well over a million" is split into the four short text strings, "well", "over", "a", and "million", a small font size is determined for the short text strings "over" and "a" both being composed of only characters whose height is small and a large font size is determined for the short text strings "well" and "million" both including some characters whose height is great.

FIGS. 2A, 2B, 2C, and 2D are explanatory views of an image file having a text string, which is composed of short text strings whose font sizes are determined as described above.

FIG. 2A illustrates a text image 100 displayed in a hollow manner. FIG. 2B illustrates the text image 100 having the text string 200; it should be understood that the text string 200 is indicated in bold for the sake of convenience but it is actually embedded behind the text image 100 in a transparent manner. The short text strings "over" and "a" have a small font size.

When a user searches this image file for the text string "well over a million", the relevant short text strings are displayed in an inverted manner as illustrated in FIG. 2C. More specifically, the short text strings are displayed in an inversed manner while having different heights as illustrated in FIG. 2C because the embedded text string is composed of the short text strings having both great and small font sizes and the text areas have different heights. The different heights of the short text strings displayed in an inversed manner negatively affect the legibility, which is not user-friendly.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming apparatus including:

a scanner that obtains an image file by document scanning;

a character recognition processor that obtains a text string from each line of text by performing character recognition on the image file, the image file being obtained by the scanner;

a text string splitter that splits each the text string into a plurality of short text strings in accordance with a predetermined rule, the each text string being obtained from each line of text by the character recognition processor;

a font size determining portion that determines a uniform font size for each the text string, the each text string being obtained from each line of text by the character recognition processor;

a position determining portion that determines x-axis positions for the short text strings to be embedded in the image file, on the basis of the x-coordinates of the characters at the forefront in the respective short text strings, the short text strings each having its x-axis in the forward and backward reading directions; and an embedding portion that embeds text data of the short text strings in the image file at the respective x-axis positions in the uniform font size for the entire text string, the x-axis positions being determined by the position determining portion, the uniform font size being determined by the font size determining portion.

A second aspect of the present invention relates to a text data embedding method to be implemented by an image forming apparatus, the text data embedding method including:

obtaining an image file by document scanning;

obtaining a text string from each line of text by performing character recognition on the image file, the image file being obtained by document scanning;

splitting each the text string into a plurality of short text strings in accordance with a predetermined rule, the each text string being obtained from each line of text by character recognition;

determining a uniform font size for each the text string, the each text string being obtained from each line of text by character recognition;

determining x-axis positions for the short text strings to be embedded in the image file, on the basis of the x-coordinates of the characters at the forefront in the respective short text strings, the short text strings each having its x-axis in the forward and backward reading directions; and embedding text data of the short text strings in the image file at the respective determined x-axis positions in the determined uniform font size for the entire text string.

A third aspect of the present invention relates to a non-transitory computer-readable recording medium storing a text data embedding program for making a computer of an image forming apparatus execute:

obtaining an image file by scanning a document;

obtaining a text string from each line of text by performing character recognition on the image file, the image file being obtained by document scanning;

splitting each the text string into a plurality of short text strings in accordance with a predetermined rule, the each text string being obtained from each line of text by character recognition;

determining a uniform font size for each the text string, the each text string being obtained from each line of text by character recognition;

determining x-axis positions for the short text strings to be embedded in the image file, on the basis of the x-coordinates of the characters at the forefront in the respective short text strings, the short text strings each having its x-axis in the forward and backward reading directions; and embedding text data of the short text strings in the image file at the respective determined x-axis positions in the determined uniform font size for the entire text string.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIGS. 6A-C are explanatory views of another embodiment of the present invention;

FIG. 7 is an explanatory view of yet another embodiment of the present invention.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying figures.

Figure 1:
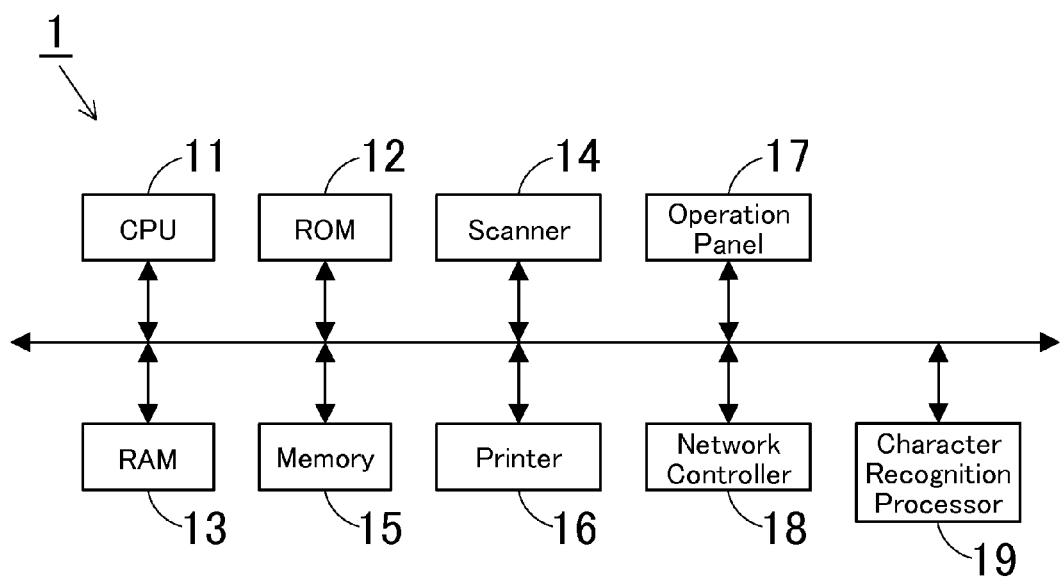
FIG. 1 is a block diagram illustrating a basic configuration of an image forming apparatus according to one embodiment of the present invention.

FIG. 1 is a block diagram illustrating a basic configuration of an image forming apparatus 1 according to one embodiment of the present invention. In this embodiment, a MFP having various functions such as a copier function, a printer function, and a scanner function, as described above, is employed as the image forming apparatus 1.

The image forming apparatus 1 is provided with: a CPU 11; a ROM 12; a RAM 13; a scanner 14; a memory 15; a printer 16; an operation panel 17; a network controller (NIC) 18; a character recognition processor 19; and others.

The CPU 101 controls the entire image forming apparatus 1 in a unified and systematic manner, allowing users to use basic functions of the image forming apparatus 1, such as a copier function, a printer function, a scanner function, and a facsimile function. The scanner 14 obtains a text image by scanning a document and the character recognition processor 19 converts the text image into text data by performing character recognition. After the text data is embedded in the image file, the image file can be converted into another file format such as PDF, can be transferred to an external apparatus such as a user terminal, or can be stored on the memory 15, which will be later described in detail.

The ROM 12 is a memory that stores operation programs for the CPU 11 and other data.

The RAM 13 is a memory that provides a work area for the CPU 11 to perform processing in accordance with an operation program.

The scanner 14 is an image reader that converts physical images into digital images by scanning a document put on a platen (not shown in this figure).

The memory 15 is comprised of a non-volatile memory device such as a hard disk drive (HDD). The memory 15 stores: document images obtained by the scanner 14; data received from other image forming apparatuses and user terminals; various applications, and others.

The printer 16 prints the following in a selected print mode: a document image obtained by the scanner 14; print data received from user terminals; and others.

The operation panel 17 is used for user inputs and others. The operation panel 17 is provided with: a display that is comprised of a liquid-crystal display with touch-panel functionality that displays messages, operation screens, and others; and a key input section that is provided with a numeric keypad; a start key; a stop key; and other keys.

The network controller 18 maintains data transmission and receipt by controlling communication with external apparatuses on the network such as other image forming apparatuses and user terminals.

The character recognition processor 19 converts a document image obtained by the scanner 14 into text data by performing character recognition. The character recognition processor 19 is configured as one of the functions of the CPU 11.

Hereinafter, a text data embedding method according to one embodiment of the present invention to be implemented by the image forming apparatus 1 will be described.

The scanner 14 obtains a document image by scanning a document including text; the character recognition processor 19 obtains text data by performing character recognition on the document image.

Subsequently, the CPU 11 splits a text string, which is text data obtained from each line of text, into a plurality of short text strings in accordance with a predetermined rule. In this embodiment, the text string is "well over a million" and this alphabetical text string is split at every space into a plurality of short text strings, which will be later described in detail. It is preferred that the alphabetical text string is split at every space, comma, dot, or at least one of two or all the three of the foregoing thus it may be split at every comma or dot instead of space.

Figure 3:
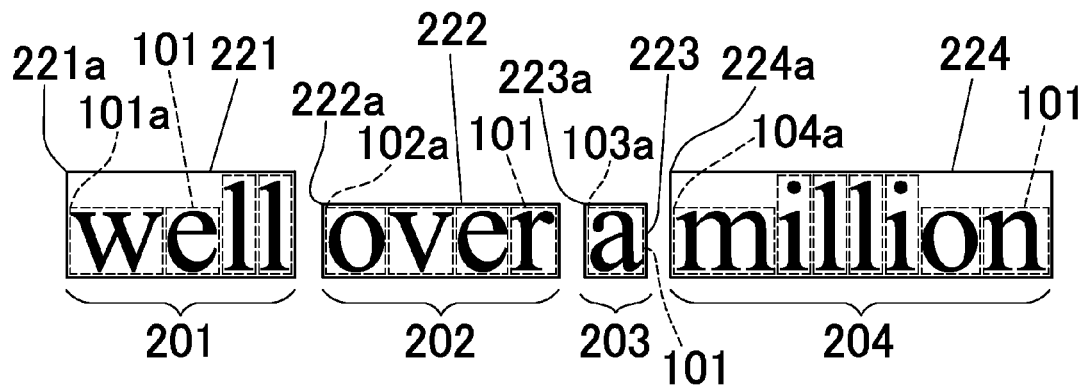
FIG. 3 is a view illustrating a text string that is split into a plurality of short text strings after being obtained by character recognition.

As a result of character recognition, as illustrated in FIG. 3, the character recognition processor 19 outputs a text code and the coordinate of each character in a circumscribed rectangle 101 indicated by a dashed line. Subsequently, spaces are detected from the text code and the text string is split at the detected spaces into a plurality of short text strings 201-204. In this embodiment, the short text strings 201-204 are four words as "well", "over", "a", and "million". When it comes to commas or dots, the short text strings 201-204 are obtained similarly.

In the conventional method, the character recognition processor 19 does not output font size information thus font sizes that correspond to the greatest heights among those of the circumscribed rectangles 221-224, which are equivalent to the greatest heights among those of characters in the short text strings 201-204, are defined font sizes for the short text strings 201-204. The circumscribed rectangles 221-224 circumscribe the respective sets of the circumscribed rectangles 101 each circumscribing one character. The circumscribed rectangles 221-224 represent text areas in which the short text strings 201-204 are displayed in an inverted manner upon a string search.

Figures 5A, 5B:
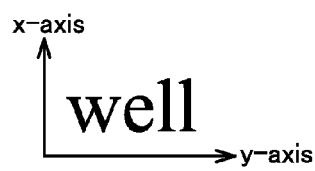
FIG. 5A is a short text string having its x-axis and y-axis.
FIG. 5B is a table containing the results of the conventional embedding process and the embedding process according to the embodiment of the present invention.

FIG. 5A is a short text string having its x-axis in the forward and backward reading directions (horizontal directions). X-coordinates for the short text strings 201-204 are determined on the basis of the x-coordinates of the base positions of the characters at the forefront in the short text strings 201-204 and the short text strings 201-204 are embedded in the image file at the determined positions in the determined font sizes.

More specifically, for example, as illustrated in FIG. 3, the upper-left corners of the circumscribed rectangles 101 for the characters "w", "o", "a", and "m" at the forefront in the short text strings 201-204 are defined as base positions 101a-104a of the characters "w", "o", "a", and "m" and the upper-left corners that indicate the start of the circumscribed rectangles 221-224 for the short text strings 201-204 are defined as first base positions 221a-224a of the short text strings 201-204. Text data of the short text strings 201-204 is embedded such that the x-coordinates of the first base positions 221a-224a of the short text strings 201-204 are equal to the x-coordinates of the base positions 101a-104a of the characters "w", "o", "a", and "m", respectively.

As illustrated in FIG. 5A, the text string also has its y-axis in perpendicular directions (vertical directions) to the forward and backward reading directions and y-axis positions for the short text strings 201-204 to be embedded in the image file are determined, respectively.

Figure 2A:
FIGS. 2A-D are explanatory views of how a conventional embedding process and an embedding process according to the embodiment of the present invention are different from each other.
Figure 2B:
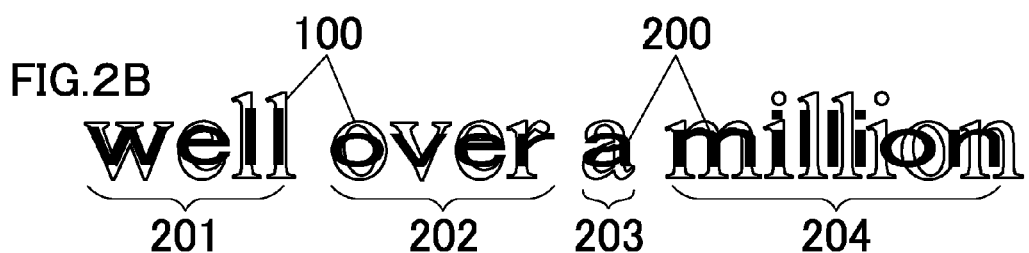
Figure 2C:
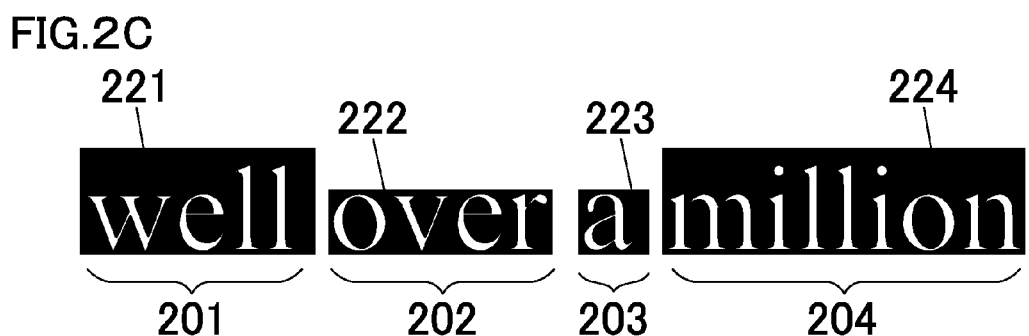

The determined font sizes for the short text strings 201-204 are different thus the circumscribed rectangles 221-224 have different heights, and upon a string search, as illustrated in FIG. 2C, the short text strings 201-204 are displayed in an inverted manner while having different heights, which affects the legibility negatively. Furthermore, the different y-axis positions for the short text strings 201-204 cause an error in adjustment of y-axis position, and upon a string search, the short text strings 201-204 are displayed in an inversed manner at different y-axis positions while having different heights, which affects the legibility even more negatively.

As a solution to the problem, in this embodiment, a uniform font size for the entire text string obtained from each line of text is determined.

In this embodiment, a font size that corresponds to the greatest height among those of characters in the text string is defined as a uniform font size for the entire text string. Alternatively, a font size that corresponds to the smallest height among those of characters in the text string or that corresponds to an average height of characters in the text string may be defined as a uniform font size for the entire text string. This method makes it simple to obtain an appropriate font size; however, it should be understood that it is in no way limited to this embodiment.

Figure 2D:
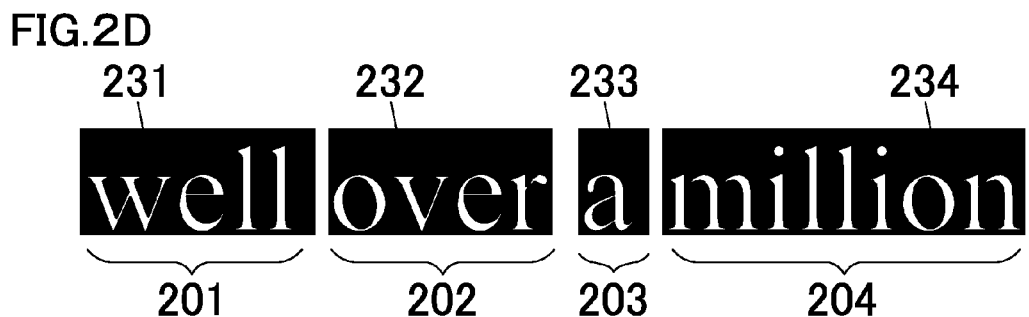
Figure 4:
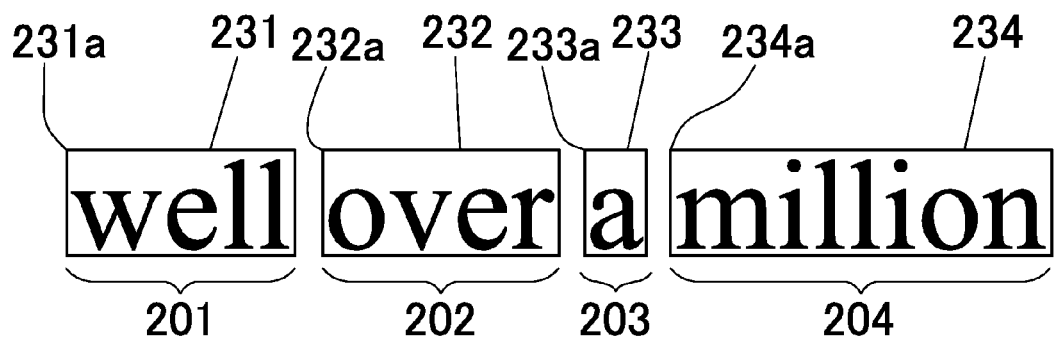
FIG. 4 is a view illustrating text areas for the short text strings embedded by the embedding process according to the embodiment of the present invention.

Since a uniform font size for the entire text string is determined, the rectangular text areas 231-234 for the short text strings 201-204 to be embedded in the image file have an equal height as illustrated in FIG. 4. And upon a string search, as illustrated in FIG. 2D, the short text strings 201-204 are displayed in an inversed manner while having an equal height due to the text areas 231-234. In the above-described manner, errors in adjustment of y-axis position due to different font sizes are prevented for good legibility.

The upper-left corners of the rectangular text areas 231-234 for the short text strings 201-204 are defined as second base positions 231a-234a for the short text strings 201-204, as illustrated in FIG. 4, and text data of the short text strings 201-204 is embedded such that the x-coordinates of the second base positions 231a-234a of the short text strings 201-204 are equal to the x-coordinates of the base positions 101a-104a (shown in FIG. 3) of the characters "w", "o", "a", and "m" at the forefront in the short text strings 201-204.

In the above-described manner, text data of the short text strings 201-204 is embedded without an error in adjustment of x-axis position, and upon a string search, the short text strings 201-204 are displayed in an inversed manner while having an equal height.

Meanwhile, it is preferred that text data of the short text strings be embedded such that a y-axis position for the short text strings is equal to that of the respective text images. In this embodiment, a y-axis position for the short text strings are determined as described below. The heights of the short text strings 201-204 are defined as the greatest heights of those of characters in the short text strings 201-204, and the y-coordinate of the short text string having the greatest height among those of the short text strings 201-204 is defined as a common y-coordinate for the short text strings 201-204.

More specifically, as illustrated in FIG. 3, the circumscribed rectangles 221-224 reflect the greatest height among those of the short text strings 201-204, and the y-coordinate of the first base position 224a of the circumscribed rectangle 224 having the greatest height among those of the short text strings 201-204 is defined as a common y-coordinate for the short text strings 201-204, for example. Text data of the short text strings 201-204 is embedded in the image file such that the common y-coordinate for the short text strings 201-204 is equal to the y-coordinate of the second base position 231a-234a of the short text strings 201-204.

As described above, the short text strings 201-204 are embedded behind the respective text images without an error in adjustment of y-axis position, and upon a string search, the short text strings 201-204 are displayed in an inversed manner at a common y-axis position for the short text strings 201-204 while having an equal height. In the above-described manner, errors in adjustment of y-axis position are also prevented for good legibility.

In this embodiment, a common y-coordinate for the short text strings 201-204 is determined on the basis of the y-coordinate of the short text string 204 having the greatest height among those of the short text strings 201-204. Alternatively, a common y-coordinate for the short text strings 201-204 may be determined on the basis of any one of the following: the y-coordinate of the first base position 223a of the short text string 203 having the smallest height among those of the short text strings 201-204; an average value of the y-coordinates of the first base positions 221a-223a of the short text strings 201-204; and the y-coordinate of the first base position 221a of the short text string 201 at the forefront among the short text strings 201-204.

The above-described embedding process is performed on all text strings obtained. FIG. 5B is an example of font sizes and positions for the short text strings which are determined in this embodiment.

As understood with reference to FIG. 5B, a font size (text size) and y-axis position for each short text string are determined in the conventional embedding process and a uniform font size and y-axis position for the entire text string are determined in this embodiment.

Some characters in a text string obtained from each line of text by character recognition may have a significantly large font size. For example, as shown in FIG. 6A, it is the character "W" at the forefront among the characters in the short text string "Well". It is very common to start a sentence with a large capital when it comes to English magazines and other forms of English publications. In this case, if a font size that corresponds to the greatest height among those of characters in the text string is defined as a uniform font size for the entire text string, it can cause a large error in position, because sizes of the other characters become too large. Alternatively, some characters in a text string obtained by character recognition from each line of text may have a significantly small font size. In this case, if a font size that corresponds to the smallest height among those of characters in the text string is defined as a uniform font size for the entire text string, it can cause a large error in position, because sizes of the other characters become too small.

As a solution, in another embodiment to be described below, if a special character whose size is greater or smaller than a reference size is detected from a text string, the special character is counted as one short text string when the text string is split, but it is not counted when a uniform font size for the entire text string is determined. Meanwhile, a font size for the special character is determined on the basis of the height of the special character.

For example, in FIG. 6A, the character "W" is a special character. As the special character "W" is counted as one short text string when the text string is split, five short text strings 301-305 as "W", "ell", "over", "a", and "million" are obtained.

As the special character "W" is not counted when a uniform font size for the entire text string is determined, a font size for the short text strings 302-305 as "ell", "over", "a", and "million" is determined. Furthermore, coordinates for the short text strings 301-305 are determined. Here, a uniform font size for the entire text string and coordinates for the short text strings 301-305 are determined in the manner as described with reference to FIGS. 2-4 which relate to a text string having no special character.

Meanwhile, a font size for the special character "W" is determined on the basis of the height of the special character "W".

FIG. 6B illustrates the short text strings obtained in the above-described manner. In this embodiment, apart from the short text string 301 having the special character "W", the short text strings 302-305 have a common font size, and upon a string search, the short text strings 302-305 are displayed in an inversed manner while having an equal height due to the text areas 312-315 for the short text strings 302-305, which contributes to good legibility.

The text string does not always have one special character and does not always have one or more character at the forefront. If a plurality of special characters are detected, it is not easy to identify short text strings having the special characters and the control is required to be complicated.

As a solution, in the embodiment, after the short text strings 301-305 as "W", "ell", "over", "a", and "million" are obtained, font sizes and coordinates for the five short text strings 301-305 may be determined, respectively. In this case, upon a string search, as illustrated in FIG. 6C, the text areas 321-325 of the short text strings 301-305 have different heights; however, errors in adjustment of position due to significantly large or small font size are prevented.

Alternatively, in this embodiment, the special character may not be counted as one short text string when the text string is split such that font sizes and coordinates for four short text strings as "Well", "over", "a", and "million" are determined, respectively.

At the end of the embedding process, the image file having the embedded text data is converted into PDF or other file formats then is transferred to a user terminal, for example, or stored on the memory 15 and users are allowed to perform a string search on the image file having the embedded text data.

In the above-described embodiment, an alphabetical text string is split into a plurality of short text strings at every space, comma, or dot.

Meanwhile, a Japanese text string is not suitable for being split at every space, comma, or dot because spaces, commas, and dots are rarely used in Japanese documents.

Therefore, when a Japanese text string is obtained, it may be split into a plurality of short text strings at every N number of characters. N is an integer greater than zero.

FIG. 7 illustrates yet another embodiment in which a Japanese text string is split at every N number of characters. In FIG. 7, N equals three and the Japanese text string is split into three short text strings 401-403.

A common font size for the three short text strings 401-403 is determined. In this embodiment, a font size that corresponds to the greatest height among those of characters in the text string is defined as a uniform font size for the entire text string. Alternatively, a font size that corresponds to the smallest height among those of characters in the text string or that corresponds to an average height of characters in the text string may be defined as a uniform font size for the entire text string.

Since a uniform font size for the entire text string is determined, the rectangular text areas 411-413 for the short text strings 401-403 to be embedded in the image file have an equal height. And upon a string search, the short text strings 401-403 are displayed in an inversed manner while having an equal height due to the text areas 411-413. In the above-described manner, errors in adjustment of y-axis position due to different font sizes are prevented for good legibility.

More specifically, the upper-left corners of the rectangular text areas 411-413 for the short text strings 401-403 are defined as third base positions 411a-413a for the short text strings 401-403, and the short text strings 401-403 are embedded such that the x-coordinates of the third base positions 411a-413a of the short text strings 401-403 are equal to the x-coordinates of the base positions 111a-113a of the characters at the forefront in the short text strings 401-403.

In the above-described manner, text data of the short text strings 401-403 is embedded without an error in adjustment of x-axis position, and upon a string search, the short text strings 401-403 are displayed in an inversed manner while having an equal height, which contributes to good legibility.

Still more specifically, a common y-coordinate for the short text strings 401-403 is determined such that it is equal to the y-coordinate of the base position of the short text string having the greatest height among those of the short text strings 401-403. That is, the short text strings 401-403 are embedded in the image file such that the common y-coordinate for the short text strings 401-403 is equal to the y-coordinate of the third base position 411a-413a of the short text strings 401-403.

In the above-described manner, the short text strings 401-403 are embedded without an error in adjustment of y-axis position, and upon a string search, the short text strings 401-403 are displayed in an inversed manner at a common y-axis position for the short text strings 401-403 while having an equal height, which further contributes to good legibility.

In this embodiment, a common y-coordinate for the short text strings 401-403 is determined on the basis of the y-coordinate of the short text string having the greatest height among those of the short text strings 401-403. Alternatively, a common y-coordinate for the short text strings 401-403 may be determined on the basis of any one of the following: the y-coordinate of the third base position of the short text string having the smallest height among those of the short text strings 401-403; an average value of the y-coordinates of the third base positions 411a-413a of the short text strings 401-403; and the y-coordinate of the third base position 411a of the short text string 401 at the forefront among the short text strings 401-403.

N is an integer greater than zero as described above; however, upon a small value for N, many short text strings are obtained and a large amount of data is described while the short text strings are embedded in the image file, which can cause the file size greater than necessary. In contrast, upon a great value for N, each obtained short text string has a large horizontal width, which can cause a large error in position adjustment. N may be set to a great value for small file size and may be set to a small value for accuracy in position adjustment. In this case, N may be set to a great or small value upon a user selecting small file size or accuracy in position adjustment with a switch for the selection. Alternatively, N may be set to a small value for accuracy in position adjustment upon normal PDF being selected and may be set to a great value for small file size upon compact PDF being selected.

Further alternatively, N may be set to a small value upon a high resolution (for example, a resolution of 400 or 600 dpi) being specified for document scanning by the scanner 14 and may be set to a great value upon a low resolution being specified for the same.

In the above-described manner, users are allowed to obtain an appropriate number of small text strings as necessary.

Figure 8:
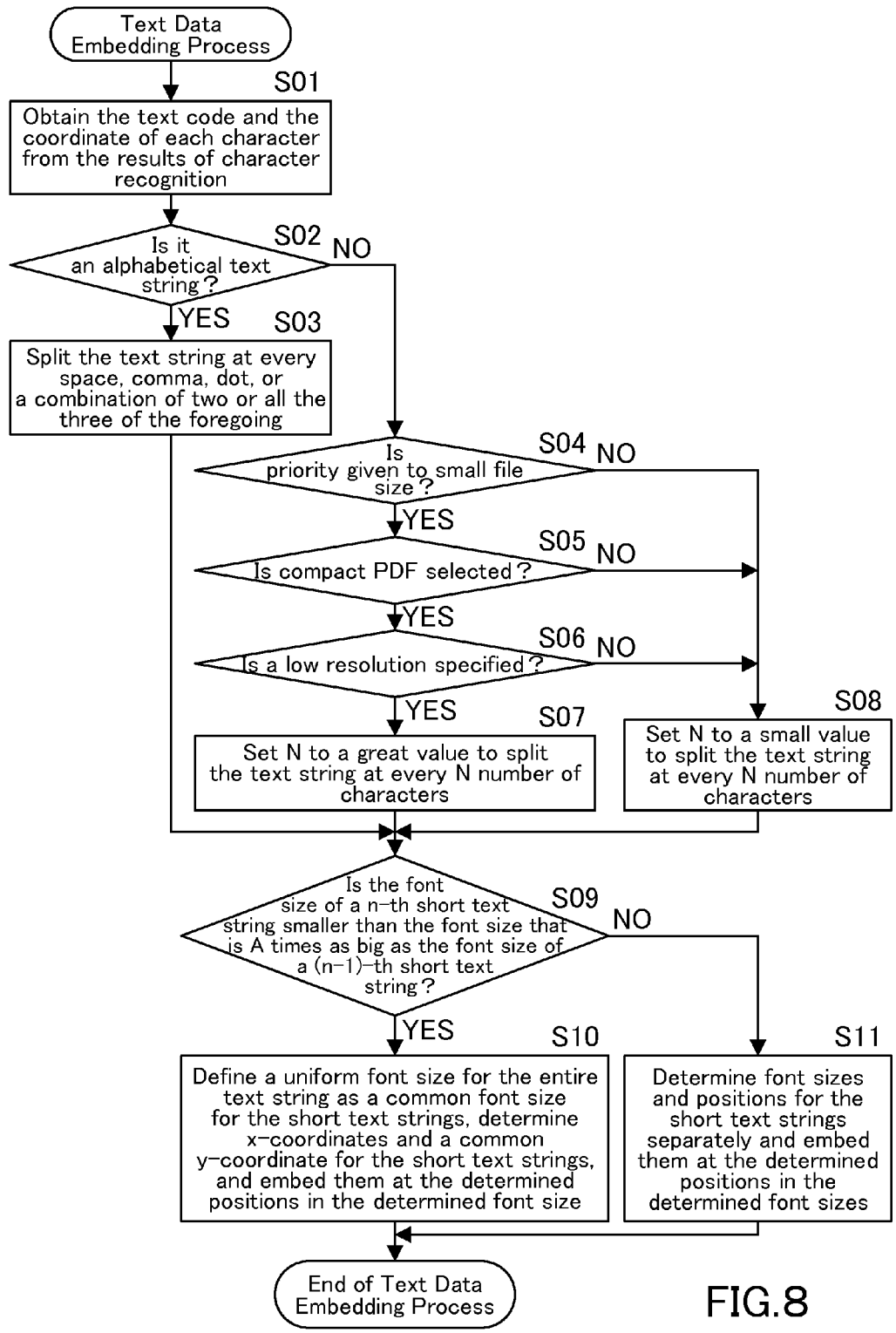
FIG. 8 is a flowchart representing an operation of the image forming apparatus of FIG. 1.

FIG. 8 is a flowchart representing a text data embedding process performed by the image forming apparatus 1. The process is executed by the CPU 11 in accordance with an operation program stored on a recording medium such as the ROM 12.

In Step S01, the text code and coordinate of each character are obtained from the results of character recognition by the character recognition processor 19. In Step S02, it is judged whether or not it is an alphabetical text string. In other words, it is judged whether it is a double-byte text string or a single-byte text string. If it is a single-byte text string, it must be an alphabetical text string.

If it is an alphabetical text string (YES in Step S02), the text string is split into short text strings at every space, comma, dot, or a combination of two or all the three of the foregoing. Then the routine proceeds to Step S09. If it is not an alphabetical text string (NO in Step S02), it is further judged in Step S04 whether or not priority is given to small file size. If priority is given to small file size (YES in Step S04), it is further judged in Step S05 whether or not compact PDF is selected.

If compact PDF is selected (YES in Step S05), it is further judged in Step S06 whether or not a low resolution is specified. If a low resolution is specified (YES in Step S06), N is set to a great value and the text string is split at every N number of characters. Then the routine proceeds to Step S09.

In any of the following cases: if priority is not given to small file size (NO in Step S04); if compact PDF is not selected (NO in Step S05); and if a low resolution is not specified (NO in Step S06), the routine proceeds to Step S08 in which N is set to a small value and the text string is split at every N number of characters. Then the routine proceeds to Step S09.

In Step S09, it is judged whether or not the font size of a n-th short text string (the greatest font size among those of characters in a n-th short text string) is smaller than the font size that is A times as big as the font size of a (n−1)-th short text string (the greatest font size among those of characters in a (n−1)-th short text string). In other words, it is judged whether the n-th short text string includes any special character for its significantly large size. It may be additionally judged whether the n-th short text string includes any special character for its significantly small size. It should be noted that, provided n equals 1, it is judged whether or not the font size of the short text string at the forefront among the short text strings is smaller than the font size that is A times as big as the font size of the short text string at the aftermost among the short text strings. Alternatively, in Step S09, it may be judged whether or not the font size of a n-th character is smaller than the font size that is A times as big as the font size of a (n−1)-th character.

If the font size of a n-th short text string is smaller than the font size that is A times as big as the font size of a (n−1)-th short text string (YES in Step S09), this means that the short text strings do not include any special character for its size. In Step S10, a uniform font size for the entire text string is defined as a common font size for the short text strings and x-coordinates for the short text strings and a common y-coordinate for the short text strings are determined. Subsequently, the short text strings are embedded in the image file at the determined positions in the determined font size.

If the font size of a n-th short text string is not smaller than the font size that is A times as big as the font size of a (n−1)-th short text string (NO in Step S09), this means that the short text strings include any special character for its size. In Step S11, font sizes and positions for the short text strings are determined separately and the short text strings are embedded in the image file at the determined positions in the determined font sizes. Alternatively, if NO in Step S09, a common font size for the short text strings, exclusive of the special character, may be determined in Step S11.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
   a scanner that obtains an image file by document scanning;
   a character recognition processor that obtains a text string from each line of text by performing character recognition on the image file, wherein each text string respectively corresponds to one line of text in the image file;
   a text string splitter that splits each text string into a plurality of short text strings in accordance with a predetermined rule, wherein at least one of the plurality of short text strings which form one text string corresponding to one line of text in the image file comprises a plurality of characters;
   a font size determining portion that determines a uniform font size for each text string such that the plurality of short text strings, which form the text string and which include the at least one short text string comprising the plurality of characters, have the same uniform font size;
   a position determining portion that determines an x-axis position for each of the short text strings to be embedded in the image file, based on x-coordinates of characters at a forefront of the respective short text strings, the short text strings including the at least one short string text string comprising the plurality of characters, wherein an x-axis of each short text string is aligned along forward and backward reading directions; and
   an embedding portion that embeds text data of the short text strings in the image file at the respective determined x-axis positions in the determined uniform font size for the entire text string.

2. The image forming apparatus as recited in claim 1, wherein:
   a y-axis of each text string is aligned along directions perpendicular to the forward and backward reading directions;

a height of each short text string is defined as a greatest height among heights of the characters in each short text string; and a common y-coordinate for the short text strings is determined based on any one of the following: (1) a y-coordinate of the short text string having a greatest height among the short text strings; (2) a y-coordinate of the short text string having a smallest height among the short text strings; (3) an average value of y-coordinates of the short text strings; and (4) a y-coordinate of the short text string at the forefront among the short text strings.

3. The image forming apparatus as recited in claim 1, wherein the uniform font size for the entire text string is defined as any one of the following: (1) a greatest height among heights of the characters in the text string; (2) a smallest height among the heights of the characters in the text string; and (3) an average height of the characters in the text string.

4. The image forming apparatus as recited in claim 1, wherein, upon a special character being detected from the text string, the special character being special for being larger or smaller than a reference size, the text string splitter counts the special character as one short text string when splitting the text string and the font size determining portion does not count the special character when determining a uniform font size for the entire text string, and instead determines a font size for the special character by calculating a height of the special character.

5. The image forming apparatus as recited in claim 1, wherein, upon a special character being detected from the text string, the special character being special for being larger or smaller than a reference size, the font size determining portion determines font sizes for the respective short text strings.

6. The image forming apparatus as recited in claim 1, wherein the text string splitter splits each text string into a plurality of short text strings at every comma, dot, or space, or a combination of two or all three of the foregoing.

7. The image forming apparatus as recited in claim 1, wherein the text string splitter splits each text string into a plurality of short text strings at every N number of characters, N being an integer greater than zero.

8. The image forming apparatus as recited in claim 7, further comprising a value setting portion that sets N to a first value upon priority being given to small file size and that sets N to a second value smaller than the first value upon priority being given to accuracy in position adjustment of the short text strings.

9. The image forming apparatus as recited in claim 7, further comprising a value setting portion that sets N to a first value upon a low resolution being specified for document scanning by the scanner and that sets N to a second value smaller than the first value upon a high resolution being specified for the document scanning by the scanner.

10. The image forming apparatus as recited in claim 1, wherein the font size determining portion defines the font size for the text string as a common font size for the short text strings.

11. A text data embedding method to be implemented by an image forming apparatus, the text data embedding method comprising:

obtaining an image file by document scanning;

obtaining a text string from each line of text by performing character recognition on the image file, wherein each text string respectively corresponds to one line of text in the image file;

splitting each text string into a plurality of short text strings in accordance with a predetermined rule, wherein at least one of the plurality of short text strings which form one text string corresponding to one line of text in the image file comprises a plurality of characters;

determining a uniform font size for each text string such that the plurality of short text strings, which form the text string and which include the at least one short text string comprising the plurality of characters, have the same uniform font size;

determining an x-axis position for each of the short text strings to be embedded in the image file, based on x-coordinates of characters at a forefront of the respective short text strings, the short text strings including the at least one short text string comprising the plurality of characters, wherein an x-axis of each short text string is aligned along forward and backward reading directions; and embedding text data of the short text strings in the image file at the respective determined x-axis positions in the determined uniform font size for the entire text string.

12. The text data embedding method as recited in claim 11, wherein:

a y-axis of each text string is aligned along directions perpendicular to the forward and backward reading directions;

a height of each short text string is defined as a greatest height among heights of the characters in each short text string; and a common y-coordinate for the short text strings is determined based on the basis of any one of the following: (1) a y-coordinate of a short text string having a greatest height among the short text strings; (2) a y-coordinate of a short text string having a smallest height among the short text strings; (3) an average value of y-coordinates of the short text strings; and (4) a y-coordinate of the short text string at the forefront among the short text strings.

13. The text data embedding method as recited in claim 11, wherein the uniform font size for the entire text string is defined as any one of the following: (1) a greatest height among heights of the characters in the text string; (2) a smallest height among the heights of the characters in the text string; and (3) an average height of the characters in the text string.

14. The text data embedding method as recited in claim 11, wherein, upon a special character being detected from the text string, the special character being special for being larger or smaller than a reference size, the special character is counted as one short text string when the text string is split and the special character is not counted when a uniform font size for the entire text string is determined, and instead a font size for the special character is determined by calculating a height of the special character.

15. The text data embedding method as recited in claim 11, wherein, upon a special character being detected from the text string, the special character being special for being larger or smaller than a reference size, font sizes for the respective short text strings are determined.

16. The text data embedding method as recited in claim 11, wherein each text string is split into a plurality of short text strings at every comma, dot, or space, or a combination of two or all three of the foregoing.

17. The text data embedding method as recited in claim 11, wherein each text string is split into a plurality of short text strings at every N number of characters, N being an integer greater than zero.

18. The text data embedding method as recited in claim 17, further comprising setting N to a first value upon priority being given to small file size and setting N to a second value smaller than the first value upon priority being given to accuracy in position adjustment of the short text strings.

19. The text data embedding method as recited in claim 17, further comprising setting N to a first value upon a low resolution being specified for document scanning and setting N to a second value smaller than the first value upon a high resolution being specified for the document scanning.

20. The text data embedding method as recited in claim 11, wherein the font size for the text string is defined as a common font size for the short text strings.

21. A non-transitory computer-readable recording medium storing a text data embedding program for making a computer of an image forming apparatus execute functions comprising:
  obtaining an image file by scanning a document;
  obtaining a text string from each line of text by performing character recognition on the image file, wherein each text string respectively corresponds to one line of text in the image file;
  splitting each text string into a plurality of short text strings in accordance with a predetermined rule, wherein at least one of the plurality of short text strings which form one text string corresponding to one line of text in the image file comprises a plurality of characters;
  determining a uniform font size for each text string such that the plurality of short text strings, which form the text string and which include the at least one short text string comprising the plurality of characters, have the same uniform font size;
  determining an x-axis position for each of the short text strings to be embedded in the image file, based on x-coordinates of characters at a forefront of the respective short text strings, the short text strings including the at least one short text string comprising the plurality of characters, wherein an x-axis of each short text string is aligned along forward and backward reading directions; and
  embedding text data of the short text strings in the image file at the respective determined x-axis positions in the determined uniform font size for the entire text string.

22. The non-transitory computer-readable recording medium storing the text data embedding program as recited in claim 21, wherein:
  a y-axis of each text string is aligned along directions perpendicular to the forward and backward reading directions;
  a height of each short text string is defined as a greatest height among heights of the characters in each short text string; and
  a common y-coordinate for the short text strings is determined based on any one of the following: (1) a y-coordinate of the short text string having a greatest height among the short text strings; (2) a y-coordinate of the short text string having a smallest height among the short text strings; (3) an average value of y-coordinates of the short text strings; and (4) a y-coordinate of the short text string at the forefront among the short text strings.

23. The non-transitory computer-readable recording medium storing the text data embedding program as recited in claim 21, wherein the uniform font size for the entire text string is defined as any one of the following: (1) a greatest height among heights of the characters in the text string; (2) a smallest height among the heights of the characters in the text string; and (3) an average height of the characters in the text string.

24. The non-transitory computer-readable recording medium storing the text data embedding program as recited in claim 21, wherein, upon a special character being detected from the text string, the special character being special for being larger or smaller than a reference size, the special character is counted as one short text string when the text string is split and the special character is not counted when a uniform font size for the entire text string is determined, and instead a font size for the special character is determined by calculating a height of the special character.

25. The non-transitory computer-readable recording medium storing the text data embedding program as recited in claim 21, wherein, upon a special character being detected from the text string, the special character being special for being larger or smaller than a reference size, font sizes for the respective short text strings are determined.

26. The non-transitory computer-readable recording medium storing the text data embedding program as recited in claim 21, wherein each text string is split into a plurality of short text strings at every comma, dot, or space, or a combination of two or all the three of the foregoing.

27. The non-transitory computer-readable recording medium storing the text data embedding program as recited in claim 21, wherein each text string is split into a plurality of short text strings at every N number of characters, N being an integer greater than zero.

28. The non-transitory computer-readable recording medium storing the text data embedding program as recited in claim 27, wherein the program further causes the computer to execute a function comprising setting N to a first value upon priority being given to small file size and setting N to a second value smaller than the first value upon priority being given to accuracy in position adjustment of the short text strings.

29. The non-transitory computer-readable recording medium storing the text data embedding program as recited in claim 27, wherein the program further causes the computer to execute a function comprising setting N to a first value upon a low resolution being specified for document scanning and setting N to a second value smaller than the first value upon a high resolution being specified for the document scanning.

30. The non-transitory computer-readable recording medium storing the text data embedding program as recited in claim 21, wherein the font size for the text string is defined as a common font size for the short text strings.

* * * * *